United States Patent [19]

Yokoi

[11] Patent Number: 4,994,988

[45] Date of Patent: Feb. 19, 1991

[54] PRINTER HAVING A MULTI-MODE CONTROL PANEL SELECTIVELY MANIPULATABLE BETWEEN VARYING MODES OF OPERATION

[75] Inventor: Takeshi Yokoi, Kagamihara, Japan

[73] Assignee: Brother Kogyo Kabushiki Kaisha, Aichi, Japan

[21] Appl. No.: 165,100

[22] Filed: Mar. 7, 1988

[30] Foreign Application Priority Data

Apr. 8, 1987 [JP] Japan ................................ 62-86302

[51] Int. Cl.[5] ...................... G06F 3/023; H01H 13/70

[52] U.S. Cl. ................................ 364/519; 364/709.1; 364/709.15; 341/22

[58] Field of Search ................ 341/22, 23; 364/709.1, 364/709.14, 709.15, 519

[56] References Cited

U.S. PATENT DOCUMENTS 3,158,317 11/1964 Alexander ........................ 341/34 X
3,187,321 6/1965 Kameny ............................ 364/200
3,394,368 7/1968 Carl et al. .................. 340/825.79 X
3,560,964 2/1971 Bedell et al. ........................ 340/365
3,600,592 8/1971 Mahan ................................ 250/219
3,717,870 2/1973 Mathews et al. ..................... 341/23
4,030,094 6/1977 Anderson ............................ 341/23
4,119,839 10/1978 Beckmann et al. .............. 341/23 X
4,136,336 1/1979 Abe et al. ........................... 340/365
4,336,530 6/1982 Koike et al. .......................... 341/23
4,381,500 4/1983 Urata et al. .......................... 341/23
4,419,736 12/1983 Christensen et al. .............. 364/900
4,630,198 12/1986 I-Yuan ............................... 364/200
4,631,700 12/1986 Lapeyre ............................. 364/900
4,745,397 5/1988 Lagerbauer et al. ................. 341/23
4,891,176 1/1990 Tasaki ................................ 364/519

FOREIGN PATENT DOCUMENTS 1568895 of 0000 United Kingdom .

OTHER PUBLICATIONS

Rogers et al., "Portable Conversation Device", IBM Technical disclosure Bulletin, vol. 20, No. 4, pp. 1528–1529.

*Primary Examiner*—David L. Clark
*Attorney, Agent, or Firm*—Finnegan, Henderson, Farabow, Garrett & Dunner

[57] ABSTRACT

A printer selectively manipulatable between a first mode of operation and a second mode of operation, and attachable to a host computer, the printer comprising, a main printer body having a multimode control panel, versatile multiple function switches disposed in the control panel, each of the versatile switches for performing different functions in each of the first and second modes, at least a portion of the switches being allocated with a plurality of selectable functions within each mode of operation. A first label portion is fixed to the printer body in a recess of the control panel and disposed adjacent the versatile switches, the first label portion containing a first group of labels indicating first mode functions of the versatile switches, a lid member movable between a first position for exposing the first label portion, the first position corresponding to the first mode and the second position corresponding to the second mode. A second label portion is disposed on the lid member, the second label portion containing a second group of labels indicating second mode functions of the versatile switches. A controller is provided for changing the function of the versatile switches between their first mode functions and their second mode functions, and a detector is provided for detecting a change in the position of the lid member and sending a signal to the control means to change the mode of the switches in response to the change of position of the lid member.

7 Claims, 5 Drawing Sheets

PRINTER HAVING A MULTI-MODE CONTROL PANEL SELECTIVELY MANIPULATABLE BETWEEN VARYING MODES OF OPERATION

BACKGROUND OF THE INVENTION

1. Field of the Invention

The present invention relates to a printer driven by data from a host computer when in an on-line mode and irresponsive thereto when in an off-line mode.

2. Description of the Related Art

Conventional printers of this type are provided with a first group of switches for various operations and selections of functions in the on-line mode, and a second group of switches for various operations and selections of functions in the off-line mode. These switches in the first and second groups are arranged on the same plane in a main body of the printer.

According to such a conventional arrangement, since a large number of key switches are required, the printer becomes complex in structure and a large space is required to arrange these key switches, thereby disadvantageously providing a bulky printer.

In view of these drawbacks, it has been proposed to arrange a plurality of versatile switches each having a plurality of functions, and a function selection key switch for selecting one of the functions of the versatile function switch. Upon successively depressing the function selection key switch and one of the versatile switches in the stated order, one of the functions assigned to the depressed versatile switch can be achieved. That is, various functions can be selectively achieved by a single versatile switch.

Nevertheless, with the structure described above it is very troublesome to perform the selecting operation of the function selection switch, and therefore, erroneous operation may often occur.

SUMMARY OF THE INVENTION

It is therefore an object of the present invention to overcome the above described drawbacks, and to provide an improved printer.

Another object of this invention is to provide a compact printer having a reasonable number of versatile switches.

A printer according to the present invention provides versatile switches, a first label portion, a lid member, a second label portion, detection means, and control means. Each of the versatile switches is allocated with a plurality of functions, and performs one of the selected functions among its plurality of functions. The first label portion is disposed adjacent the versatile switches. The first label portion shows a first function of the versatile switch during the off-line mode. The lid member is movable between a first position exposing the first label portion and a second position for covering the same. The second label portion is disposed on the lid member, and indicates a second function of the versatile switch not indicated in the first label portion. The detection means detects the movement of the lid member when the latter member is brought into the second position for covering the first label portion. The control means changes the function of the versatile switch from its second function indicated in the second label portion to its first function indicated in the first label portion in response to a detection signal from the detection means.

Therefore, in the printer according to this invention, it is unnecessary to arrange a great number of switches, and resultant printer can be simplified in compact size. Further, the functions of the versatile switches are automatically changed by simply opening and closing the covering lid, and the switch can be operated in accordance with the indications in the label portions.

DETAILED DESCRIPTION OF THE PREFERRED EMBODIMENTS

One embodiment of the present invention will be described in detail with reference to the accompanying drawings.

Figure 1:
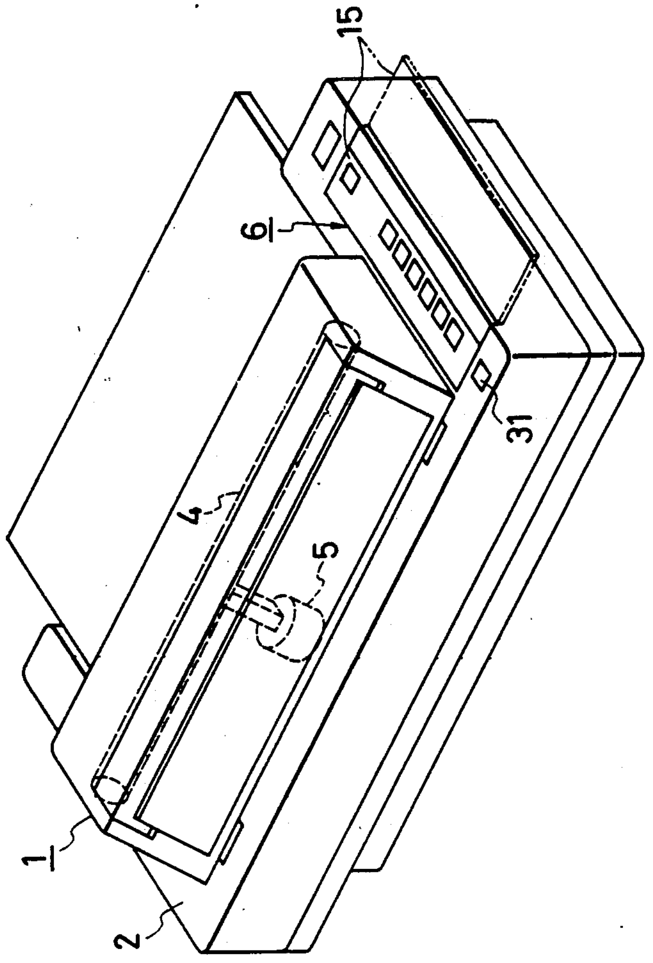
FIg. 1 is a perspective view showing a printer embodying the teachings of the present invention.

As shown in FIG. 1, a printer 1 includes a main body 2 housing a platen 4 for supporting a printing sheet fed by a sheet feeding means and a print head 5 confronting the platen 4. The print head 5 is, for example, of a wire dot type but is not limited thereto. Any type of print head can be used. An operation portion 6 is provided on an upper one side of the main body 2. The printer 1 is provided with an on-line mode responsive to an output data transferred from a host computer 7 depicted in FIG. 8, and an off-line mode irresponsive thereto. In the on-line mode, the print head 5 carries out printing on a printing sheet supported by the platen 4 in response to the output data from the host computer 7.

Figure 3:
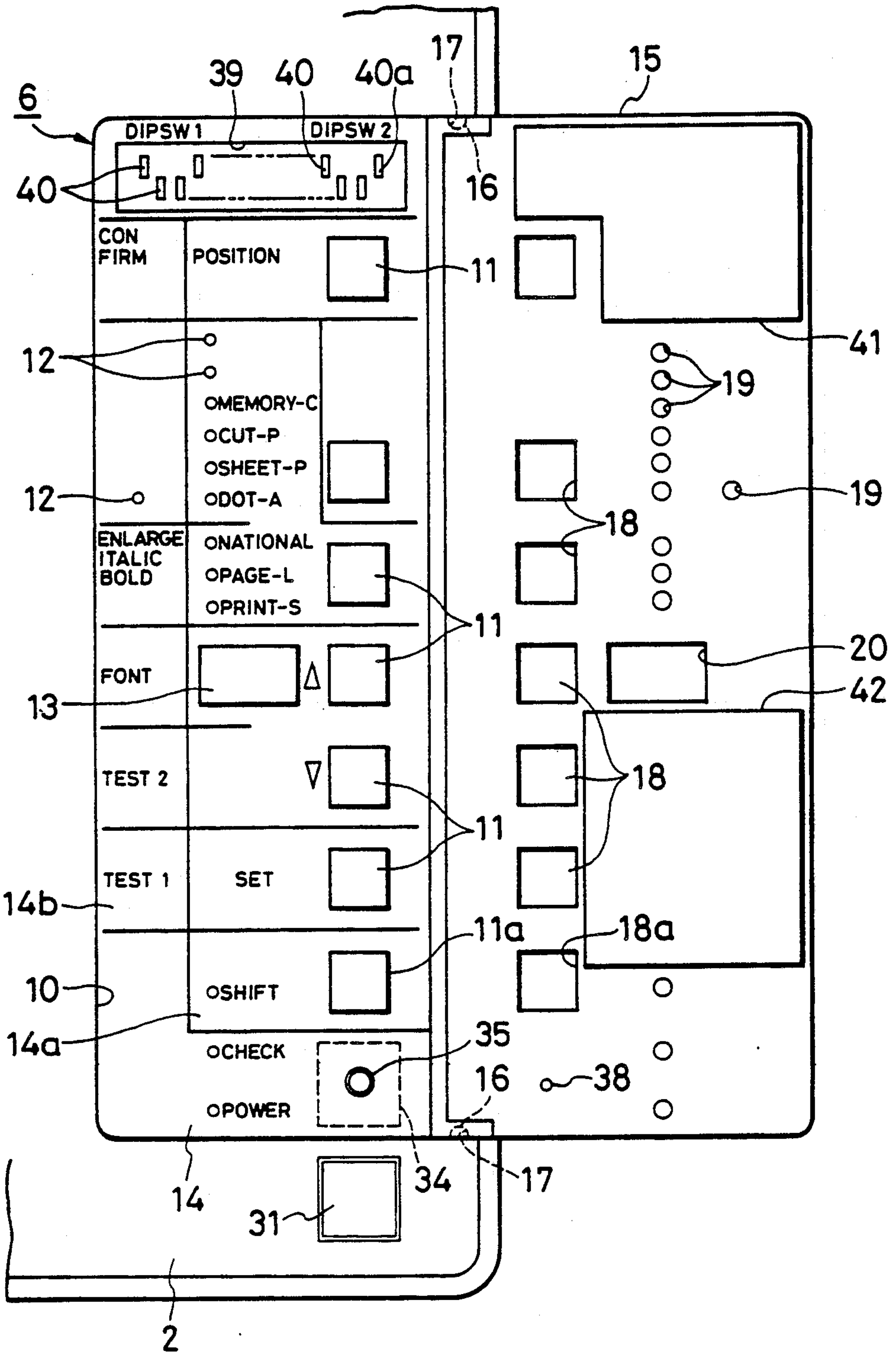
FIG. 3 is a partially enlarged plan view of the printer of FIG. 1 showing the lid member in the opened position (first position)
Figure 4:
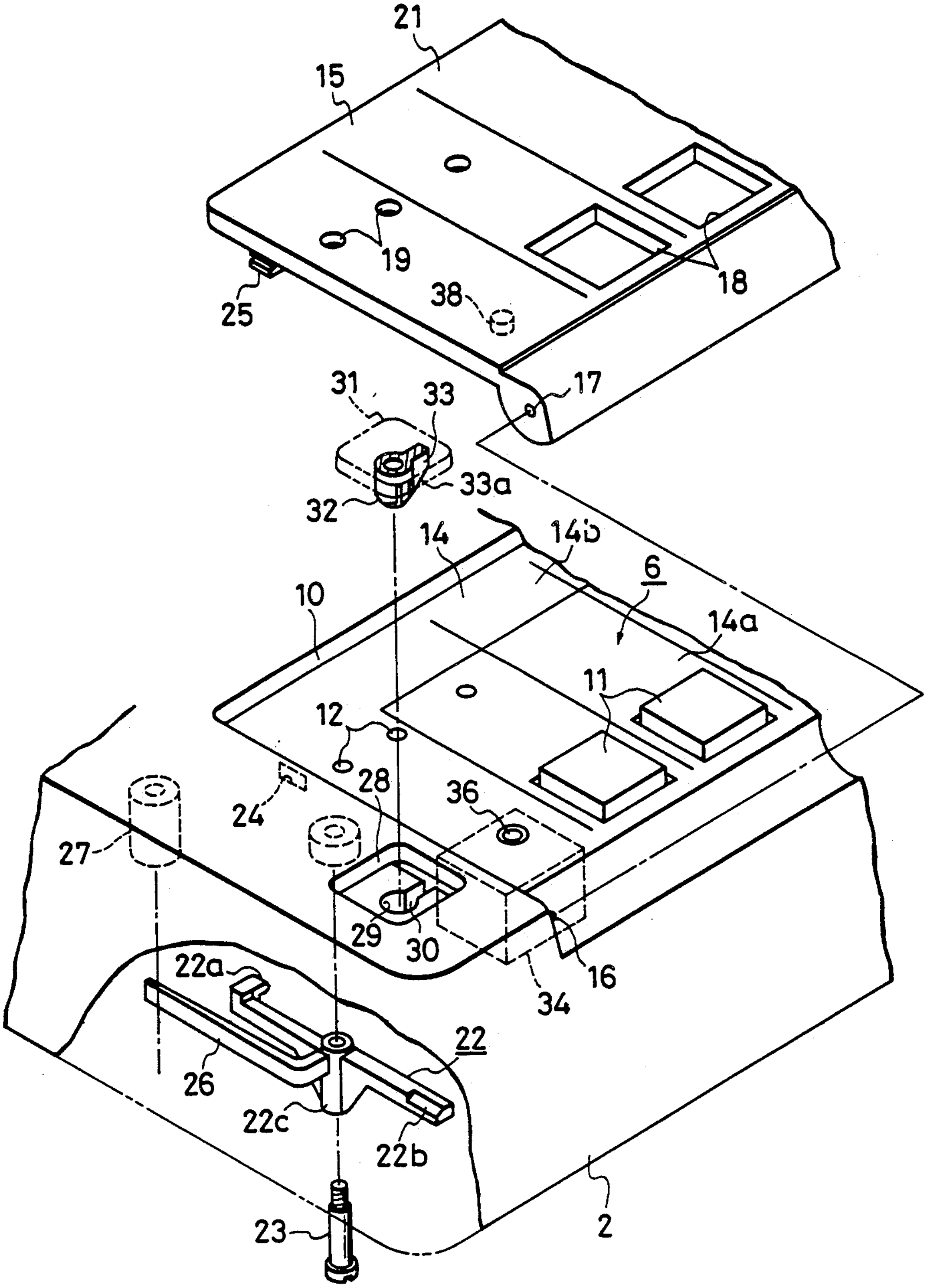
FIG. 4 is an exploded segmental perspective view of the lid member of FIG. 1 showing an operating portion.

As best shown in FIG. 4, the operation portion 6 is formed with a recess 10 on which a pivotably movable lid member 15 is adapted to be positioned. FIG. 3 shows an opened state of the lid member 15 (hereinafter referred to as a first position), a plurality of versatile switches 11 are aligned along one side of the recess 10. Each of the versatile switches 11 is allocated with a plurality of functions, and one selected function is executable. At the other side of the recess 10, there is provided an indicating portion 13 and a plurality of indication lamps 12. Each of the lamps 12 and the indicating portion 13 indicate a selected function of each of the versatile switches.

A first label portion 14 is provided on an inner bottom portion of the recess 10 and at a position adjacent the versatile switches 11, indication lamps 12 and indicating portion 13. Generally two groups of labels are attached along right and left columns of the first label portion 14, and each of the labels indicates attendant functions performed only in the off-line mode. Such functions may include test printing, selection of a typeface font, and change of the sheet feeding rate of the sheet feeding means 3. When a shift switch 11*a* is repeatedly depressed, functions of the respective versatile switches 11 are alternately changed between those shown in the right column 14*a* and those shown in the left column 14*b*.

Figure 2:
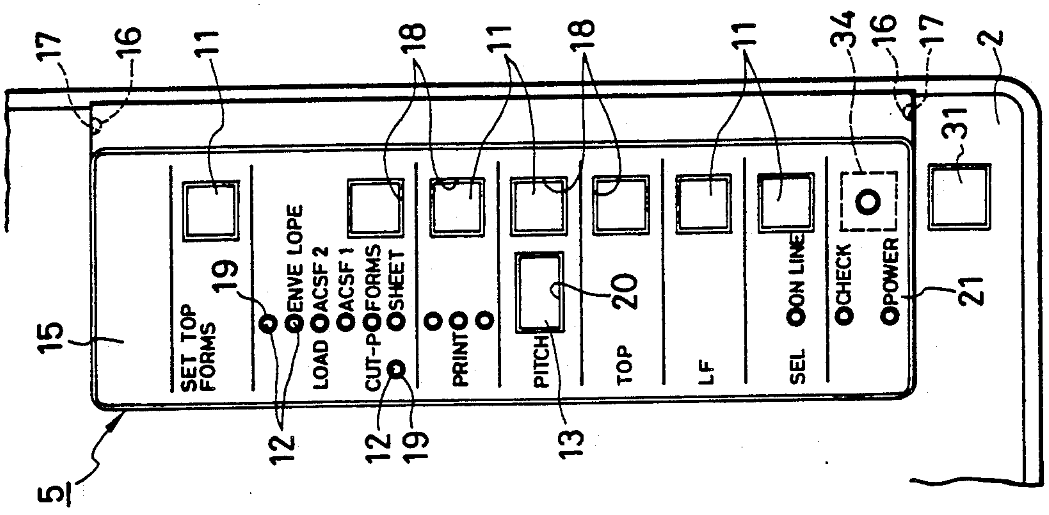
FIG. 2 is a partially enlarged plan view of the printer of FIG. 1 showing a lid member in the closed position (second position)

A lid member 15 is pivotably supported by the main body 2 through pins 16 and bores 17. As best shown in FIG. 4, the pins 16 extend from the side wall of the recess 10, and bores 17 are formed in the lid member 15 and are engagable with the pins 16. The lid member 15 is movable between a first position for covering the first label portion 14 as shown in FIG. 2 and a first position for exposing label portion 14 as shown in FIG. 3. A plurality of through-holes 18, 18*a*, 19 and 20 are formed in the lid member 15 at positions respectively corresponding to the versatile switches 11, shift switch 11*a*, indication lamps 12 and indicating portion 13. When the lid member 15 is pivotted to its second position, versatile switches 11, shift switch 11*a*, indication lamps 12 and indicating portion 13 extend through the respective through-holes 18, 18*a*, 19 and 20, so that these switches, lamps and indicating portion are exposed at an upper face of the lid member 15.

A second label portion is provided at the upper face of the lid member 15 in the second label portion 21, functions which are different from those indicated in the first label portion 14 and performable regardless of the modes of the printer are indicated corresponding to the versatile switches 11, shift switch 11*a*, indication lamps 12 and indicating portion 13. The functions indicated in the second label portion 21 may be a change of the print mode, selection of printing sheet, etc.

Figure 5:
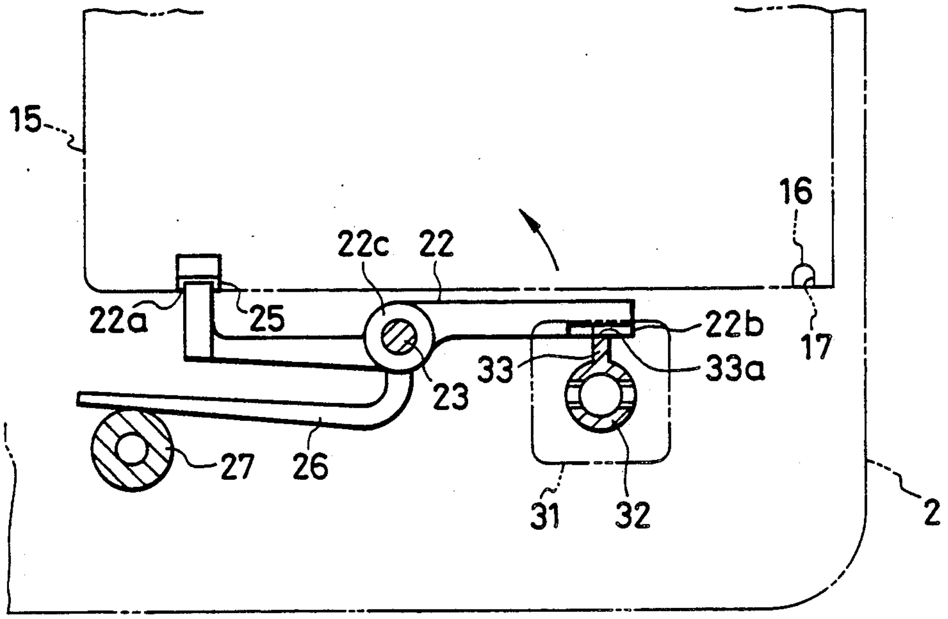
FIG. 5 is a partial transversal cross-sectional view showing a latch mechanism of the lid member shown in FIG. 1.

As shown in FIGS. 4 and 5, a latch member 22 has a central portion 22*c* rotatably supported to a lower face of a top wall of the main body 2 through a stepped portion of a stepped screw 23. The latch member 22 has one end provided with a detent 22*a* so as to hold the lid member 15 at its recess covering position (first position). An opening 24 is formed at a side wall of the recess 10, and a locking recess 25 is formed at a side surface of the lid member 15. The detent 22*a* passes through the opening 24 and is engagable with the locking recess 25. The latch member 22 has the other end formed with a slant surface 22*b*. Further, a resilient piece 26 extends from the central portion 22*c* of the latch member 22. A boss 27 extends from the lower face of the top wall of the main body 2. The resilient piece 26 is in resilient contact with the boss 27, to thereby urge the latch member 22 to rotate toward the direction to permit engagement between the detent and the locking recess 25.

A supporting recess 28 is formed at the upper face of the main body 2. In the bottom portion of the recess 28, a circular bore 29 and a groove 30 adjoining the bore 29 are formed. A release button 31 is vertically movably disposed in the supporting recess 28. At a lower face of the button 31, a cylindrical segment 32 and a projecting piece 33 are formed, which are engagable with the circular bore 29 and the groove 30, respectively. The lower end of the projecting piece 33 is formed with a slanting cam face 33*a* engagable with the slant surface 22*b* of the latch member 22. As shown in FIG. 5, when the release button 31 is depressed during the state where the lid member 25 is held at its first position by the latch member 22, the slanting cam face 33*a* slides along the slant face 22*b* to rotate the latch member 22 about the central portion 22*c* in a counterclockwise direction. As a result, the detent 22*a* is disengaged from the locking recess 25 of the lid member 15, so that the lid member 15 is brought to its unlocked state.

Figure 6:
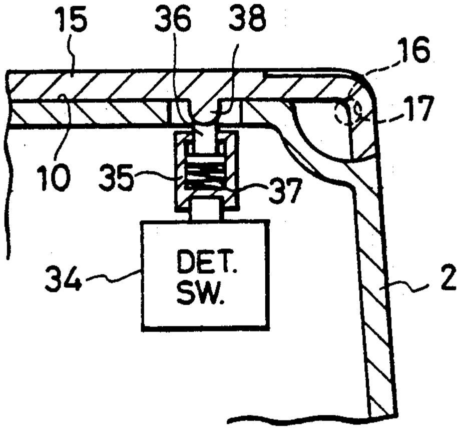
FIG. 6 is a partial vertical cross-sectional view showing a first embodiment of the detection switch portion of FIG. 1.

As shown in FIGS. 2, 4 and 6, a detection switch 34 which constitutes a detection means is disposed within the main body 2 and at a position below the recess 10. The detection means has an operating portion 35 in which an actuation member 36 is vertically movably accommodated. The actuation member 36 is urged upwardly by biasing force of a spring 37 housed in the operating portion 35. As shown in FIG. 6, when the lid member 15 is latched at its first position, a protrusion 38 extending from the lower face of the lid member 15 is in alignment with the actuation member 36 and depresses the actuation member 36 and the operating portion 35 to move downwardly. Starting from this state, when the release button 31 is depressed for releasing lid member 15, the actuation member 36 is displaced upwardly by the biasing force of the spring 37. As a result, the protrusion 38 is urged upwardly for rotating the lid member 15 toward the second position. At the same time, a detection signal is provided from the detection switch 345 in response to the upward movement of the operating portion 35.

In this embodiment, as shown in FIG. 3, the recess 10 has one end portion formed with a concave portion 39 into which two dual in-line package (DIP) switches DIPSW1 and DIPSW2 are arranged. More than two optional DIP switches may be provided. Further, at a rear surface of the lid member 15, third label portions 41 and 42 indicating the functions of the DIP switches are provided at blank portions other than the through-holes 18, 18*a*, 19 and 20. In the opened state of the lid member 15, switching operations of the DIP switches can be performed in accordance with the indications in the label portions 41 and 42.

The DIP switches on this printer control various aspects of printer operation including the data communication with the host computer. Each DIP switch has eight selectors 40, each of which serves a particular purpose as exemplified in the following Tables.

TABLE 1

(For DIP SWl)

| Selector No. | Function | ON | OFF | As delivered |
|---|---|---|---|---|
| 1 | ROM Selection | EEP-ROM | PROM | ON |
| 2 | Zero Font Selection | Ø | 0 | OFF |
| 3 | Paper Empty Detection | Disabled | Enabled | |
| 4 | Not used. | — | — | |
| 5 | Input Data Buffer | No | Yes | |
| 6 | Compatible Character Set | A-type Printer | B-type Printer | ON |
| 7 | Control Command | A-type Printer | B-type Printer | |

TABLE 1-continued

| (For DIP SW1) | | | | |
|---|---|---|---|---|
| Selector No. | Function | ON | OFF | As delivered |
| 8 | 1" Skip Perforation | Enabled | Disabled | OFF |

TABLE 2

| (For DIP SW2) | | | | |
|---|---|---|---|---|
| Selector No. | Function | ON | OFF | As delivered |
| 1<br>2<br>3<br>4 | If the 6th sector of the DIP SW1 is set up for A-type-compatible character set - that is, with 6th sector of the DIP SW 1 ON, see Table 1. If for B-type-compatible character set, with the 6th sector of the DIP SW 1 OFF, see Table 2. | | | OFF<br><br><br>OFF |
| 5 | Unidirectional Print | Enabled | Disabled | OFF |
| 6 | Line Feed Pitch | 1/8" | 1/6" | |
| 7 | $\overline{\text{SLCT IN}}$ | Internally fixed | Not fixed | ON |
| 8 | Auto Line Feed | CR + LF | CR | OFF |

Figure 8:
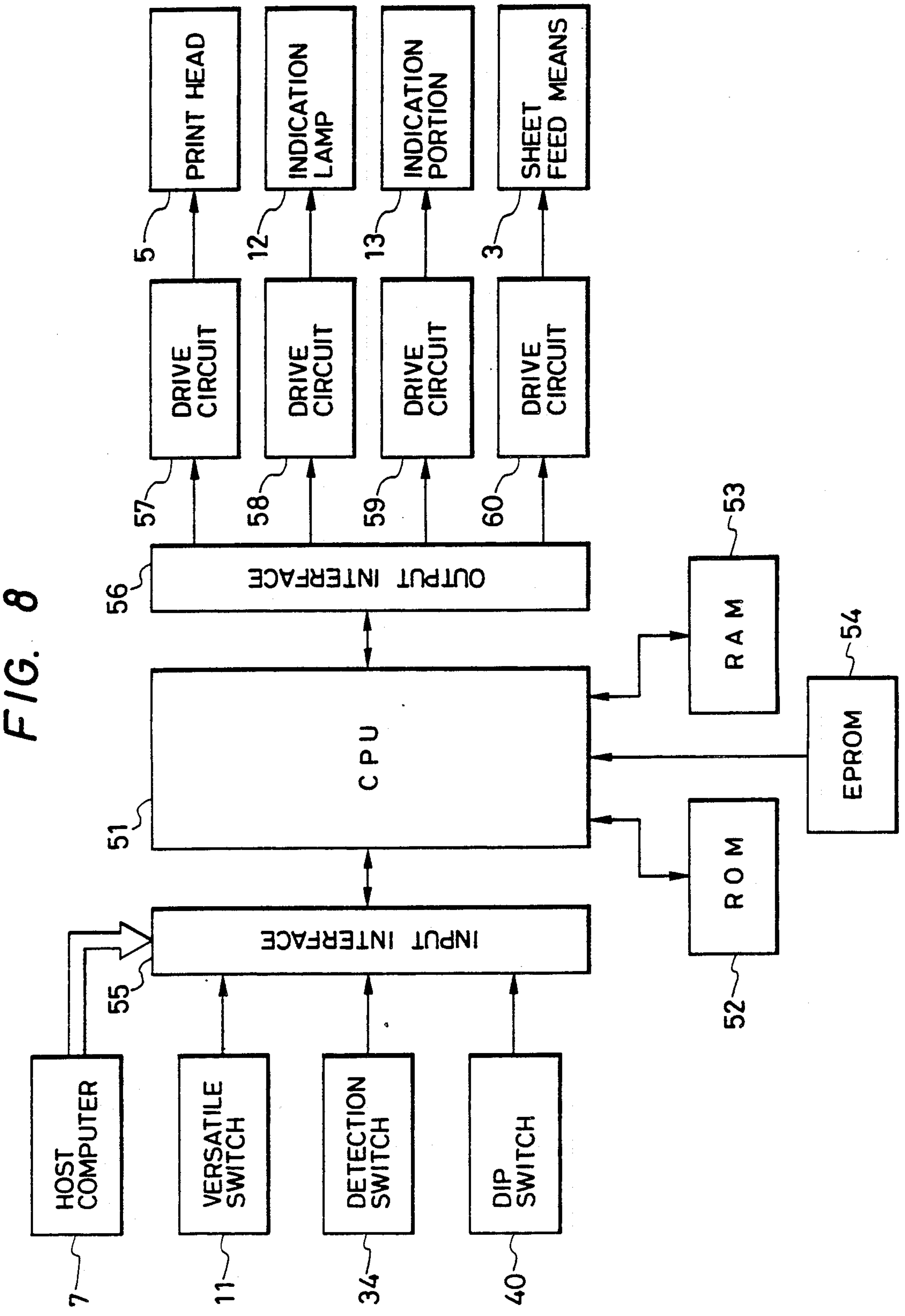
FIG. 8 is a block diagram showing a control circuit embodied in the present invention.

Referring next to FIG. 8, a control circuit associated with the operating portion 35 will be described. As shown in FIG. 8, a central processing unit (hereinafter referred to as CPU) 51 constitutes a control means connected to a read-only memory (hereinafter referred to as ROM) 52. The ROM stores a program for controlling overall operations of the printer, and a random access memory (hereinafter referred to as RAM) 53 temporarily stores output data from the host computer 7.

In addition to the program for controlling the overall operations of the printer, the ROM 52 further stores information which causes to provide a function to place the printer at an initialized state. That is, the printer is set to a state in which the same function is always accomplished in response to the information stored in the ROM 52 when the printer is powered ON. An erasable and programmable read-only memory (hereinafter referred to as EPROM) 54 is further connected to the CPU 51. Information with respect to a modified function is programmed into the EPROM 54 whenever the function set to the printer is changed from its initialized state. Therefore, even if the power supply to the printer is interrupted, the EPROM 54 will store the printer function immediately preceeding the power interruption, and hold this information during the interruption. When a specific DIP switch 40*a* is switched, the printer function corresponding information stored in the EPROM 54 is selected instead of the printer function in corresponding to information stored in the ROM 52. That is, with the switching operation of a specific DIP switch 40*a*, the printer function can be selectively set to either the initialized function or the function immediately before the power interruption.

The host computer 7, the versatile switches 11, the detection switch 34 and the DIP switches 40 are connected through an input interface 55 to the CPU 51, and supply various signals to the CPU 51. The print head 5, the indication lamps 12, the indicating portion 13, and the sheet feeding means 3 are further connected to the CPU 51 through the respective drive circuits 57, 58, 59 and 60, and an output interface 56. Start and stop signals are outputted from the CPU 51 to the print head 5, indication lamps 12, indicating portion 13 and the sheet feeding means 3.

When the lid member 15 is positioned in the recess 10 for covering the first label portion 14 as shown in FIG. 6, no detection signal is produced from the detection switch 34, so that the CPU 51 sets the printer in the on-line mode responsive to the output data supplied from the host computer 7, and at the same time, the functions of the versatile switches 11, indication lamps 12 and the indicating portion 13 are changed to those indicated in the second label portion 21 in the front surface of the lid member 15. Therefore, a desired function can be accomplished by depressing one of the versatile switches 11 while referring to the labels on the second label portion 21 during the on-line mode.

When the lid member 15 is positioned for exposing the first label portion 14 as shown in FIG. 3, the detection switch 34 outputs a detection signal indicative of opening of the lid member to the CPU 51. In response to the detection signal, the CPU 51 provides the off-line mode at which the printer is irresponsive to the output data from the host computer 7, and the functions indicated in the second label portion 21 are changed to the functions indicated in the first label portion 14. Therefore, in the off-line mode, upon depressing the shift switch 11*a* for selecting either the right column 14*a* or the left column 14*b* in the first label portion 14, and then depressing one versatile switch 11 by referring to the labels in one of the selected columns, a desired function can be accomplished.

Figure 7:
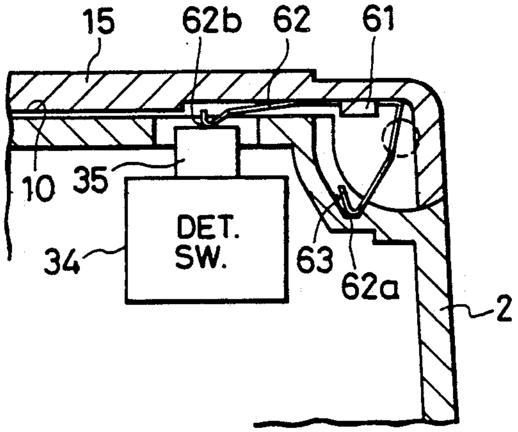
FIG. 7 is a partial vertical cross-sectional view showing a second embodiment of the detection switch portion of FIG. 1.

Another embodiment according to this invention will be described with reference to FIG. 7. In this embodiment, a boss 61 extends from a lower surface of the lid member 15, and an intermediate portion of a leaf spring 62 is attached to the boss 61. One end of the leaf spring 62 is provided with a bent locking portion 62*a* engagable with a locking recess 63 formed in the main body 2. The other end of the spring 62 is provided with a bent depressing portion 62*b* in resilient contact with an operating portion 35 of the detection switch 34. If the lid member 15 is latched at its covering position, the leaf spring 62 is deformed such that both end portions are positioned close to each other, so that the spring is energized, and the detection switch 34 is depressed downwardly. If the release button 31 is depressed for releasing latching of the lid member 15, the lid member 15 is rotated to an opening direction by the biasing force of the leaf spring 62, and the detection switch 34 provides a detection signal.

As described above, the present invention can minimize numbers of switches, and can provide a printer having a simple construction and compact size. Further, functions of the versatile switches can be automatically changed by mere opening and closing operations of the lid member, and advantageously, each of the versatile switches can be operated without fail in accordance with the description shown in the label portions.

While the invention has been described in detail and with reference to specific embodiments thereof, it will be apparent for those skilled in the art that various changes and modifications can be made without departing from the spirit and scope of the invention.

What is claimed is:

1. A printer selectively manipulatable between a first mode of operation and a second mode of operation, and attachable to a host computer, the printer comprising:

a main printer body having an operating portion disposed thereon;

switches disposed at said operating portion, each of said switches for performing different functions in each of said first and second modes, at least a portion of said switches being allocated with a plurality of selectable functions within each mode of operation;

a first label portion fixed to said printer body at the operating portion and disposed adjacent said switches, said first label portion containing a first group of labels indicating first mode functions of said switches;

a lid member movable between a first position for exposing said first label portion, and a second position for covering said first label portion, said first position corresponding to said first mode and said second position corresponding to said second mode;

a second label portion disposed on said lid member, said second label portion containing a second group of labels indicating second mode functions of said switches;

control means for changing the function of said switches between their first mode functions and their second mode functions, said control means comprising a central processing unit, a read-only memory connected to said central processing unit for storing programs for controlling overall operations of said printer, said read-only memory for also storing information for setting said printer at an initialized state, a random access memory connected to said central processing unit for temporarily storing output data from said host computer, and an erasable and programmable read-only memory connected to said central processing unit for storing renewal information corresponding to a change of functions in said printer, said switches being connected to said central processing unit;

detection means responsive to a change in the position of the lid member for changing the function of the switches between the first and second mode, said detection means being connected to said central processing unit; and dual in-line package switches disposed in said operating portion and connected to said central processing unit, one of said dual in-line switches having a function for selecting priority between said read-only memory and said erasable and programmable read-only memory.

2. A printer as defined in claim 10, further comprising a third label portion disposed at a rear surface of said lid member and containing a third group of labels indicating operations of said dual in-line package, said third label portion being visible when said lid member is at said first position.

3. A printer selectively manipulatable between a first mode of operation and a second mode of operation, and attachable to a host computer, the printer comprising:

a main printer body having an operating portion disposed thereon;

switches disposed at said operating portion, each of said switches for performing different functions in each of said first and second modes, at least a portion of said switches being allocated with a plurality of selectable functions within each mode of operation;

a first label portion fixed to said printer body at the operating portion and disposed adjacent said switches, said first label portion containing a first group of labels indicating first mode functions of said switches;

a lid member movable between a first position for exposing said first label portion, and a second position for covering said first label portion, said first position corresponding to said first mode and said second position corresponding to said second mode;

a second label portion disposed on said lid member, said second label portion containing a second group of labels indicating second mode functions of said switches;

control means for changing the function of said switches between their first most functions and their second mode functions, said control means comprising a central processing unit, a read-only memory connected to said central processing unit for storing programs for controlling overall operations of said printer, said read-only memory for also storing information for setting said printer at an initialized state, a random access memory connected to said central processing unit for temporarily storing output data from said host computer, and an erasable and programmable read-only memory connected to said central processing unit for storing renewal information corresponding to a change of functions in said printer, said switches being connected to said central processing unit;

detection means responsive to a change in the position of the lid member for changing the function of the switches between the first and second mode, said detection means being connected to said central processing unit; and a designation switch disposed in said operating portion and connected to said central processing unit, said designation switch having a function for selecting priority between said read-only memory and said erasable and programmable read-only memory.

4. A printer as defined in claim 3, further comprising a third label portion disposed at a rear surface of said lid member and containing a third group of labels indicating operations of said designation switch, said third label portion being visible when said lid member is at said second position.

5. A printer selectively manipulatable between an off-line mode and an on-line mode, and attachable to a host computer, wherein the printer is not responsive to output data from the host computer in the off-line mode and the printer is responsive to the output data in the on-line mode, the printer comprising:

a main printer body having an operating portion disposed thereon;

function switches disposed in said operating portion, each of said function switches for performing different functions in each of said off-line and on-line modes, at least a portion of said function switches being allocated with a plurality of selectable functions within each mode of operation;

a first label portion fixed to said printer body in the operating portion and disposed adjacent said function switches, said first label portion containing a first group of labels indicating first mode functions of said function switches, said first mode functions being available only in the off-line mode;

a lid member movable between a first position for exposing said first label portion and a second position for covering said first label portion, said first position corresponding to said off-line mode and said second position corresponding to said on-line mode;

a second label portion disposed on said lid member, said second label portion containing at least a second group of labels indicating on-line mode functions of said function switches;

control means for changing the function of said function switches between their first mode functions and their second mode functions, said control means including a central processing unit, a read-only memory connected to said central processing unit for storing programs for controlling overall operation of said printer, said read-only memory for also storing information for setting the printer at an initialized state, a random access memory connected to said central processing unit for temporarily storing output data from said host computer, an erasable and programmable read-only memory connected to said central processing unit for storing renewal information corresponding to a change of function in said printer, said function switches being connected to said central processing unit;

dual in-line package switches disposed in said operating portion and connected to said central processing unit, one of said dual in-line switches having a function for selecting priority between said read-only memory and said erasable and programmable read-only memory;

a third label portion disposed on a rear surface of said lid member and containing a third group of labels indicating operations of said dual in-line package switches, said third label portion being visible when said lid member is in said first position; and detection means connected to said central processing unit and responsive to a change in the position of the lid member for changing the function of the function switches between the off-line and on-line modes.

6. A printer selectively manipulatable between an off-line mode and an on-line mode, and attachable to a host computer, wherein the printer is not responsive to output data from the host computer in the off-line mode and the printer is responsive to the output data in the on-line mode, the printer comprising:

a main printer body having an operating portion disposed thereon;

switches disposed in said operating portion, each of said switches for performing different functions in each of said off-line and on-line modes, at least a portion of said switches being allocated with a plurality of selectable functions within each mode of operation;

a first label portion fixed to said printer body in the operating portion and disposed adjacent said switches, said first label portion containing a firs group of labels indicating first mode functions of said switches, said first mode functions being available only in the off-lien mode;

a lid member movable between a first position for exposing said first label portion and a second position for covering said first label portion, said first position corresponding to said off-line mode and said second position corresponding to said on-line mode;

a second label portion disposed on said lid member, said second label portion containing at least a second group of labels indicating on-line mode functions of said switches;

control means for changing the function of said switches between their first mode functions and their second mode functions;

detection mean s responsive to a change in the position of the lid member for changing the function of the switches between the off-line and on-line modes; and latching means for maintaining said lid member in said second position, said latching means cooperating with said detection means for changing the function of said switches between the first and second modes.

7. A printer selectively manipulatable between an off-line mode and an on-line mode, and attachable to a host computer, wherein the printer is not responsive to output data from the host computer in the off-line mode and the printer is responsive to the output data in the on-line mode, the printer comprising:

a main printer body having an operating portion disposed thereon;

function switches disposed in said operating portion, each of said function switches for performing different functions in each of said off-line and on-line modes, at least a portion of said function switches being allocated with a plurality of selectable functions within each mode of operation;

a first label portion fixed to said printer body in the operating portion and disposed adjacent said function switches, said first label portion containing a first group of labels indicating first mode functions of said function switches, said first mode functions being available only in the off-line mode;

a lid member movable between a first position for exposing said first label portion and a second position for covering said first label portion, said first position corresponding to said off-line mode and said second position corresponding to said on-line mode;

a second label portion disposed on said lid member, said second label portion containing at least a second group of labels indicating on-line mode functions of said function switches;

control means for changing the function of said function switches between their first mode functions and their second mode functions said control means including a central processing unit, a read-only memory connected to said central processing unit for storing programs for controlling overall operation of said printer, said read-only memory for also storing information for setting the printer at an initialized state, a random access memory connected to said central processing unit for temporarily storing output data from said host computer, an erasable and programmable read-only memory connected to said central processing unit for storing renewal information corresponding to a change of function in said printer, said function switches being connected to said central processing unit;

dual in-line package switches disposed in said operating portion and connected to said central processing unit;

a designation switch disposed in said operating portion and connected to said central processing unit, said designation switch having a function for selecting priority between read-only memory and said erasable and programmable read-only memory;

a third label portion disposed on a rear surface of said lid member and containing a third group of labels indicating operations of said dual in-line package switches and said designation switch, said third label portion being visible when said lid member is in said first position; and detection means connected to said central processing unit and responsive to a change in the position of the lid member for changing the function of the function switches between the off-line and on-line modes.

* * * * *

UNITED STATES PATENT AND TRADEMARK OFFICE
CERTIFICATE OF CORRECTION

PATENT NO. : 4,994,988

DATED : February 19, 1991

INVENTOR(S) : TAKESHI YOKOI

It is certified that error appears in the above-identified patent and that said Letters Patent is hereby corrected as shown below:

IN THE ABSTRACT:

Line 16, after "portion" insert --and a second position for covering the first label portion--.

Claim 2, column 7, line 66, change "claim 10" to --claim 1--.

Claim 3, column 8, line 31, change "most" to --mode--.

Claim 6, column 10, line 6, change "firs" to --first--; and line 23, change "mean s" to --means--.

Claim 7, column 10, line 64, after "functions" insert a comma.

Signed and Sealed this

Fourth Day of August, 1992

*Attest:*

DOUGLAS B. COMER

*Attesting Officer*

*Acting Commissioner of Patents and Trademarks*